US006804220B2

(12) United States Patent
Odenwalder et al.

(10) Patent No.: US 6,804,220 B2
(45) Date of Patent: Oct. 12, 2004

(54) METHOD AND APPARATUS FOR GENERATING CONTROL INFORMATION FOR PACKET DATA

(75) Inventors: Joseph P. Odenwalder, Rancho Santa Fe, CA (US); Yongbin Wei, San Diego, CA (US); Edward G. Tiedemann, Jr., Concord, MA (US); Stein A. Lundby, Solana Beach, CA (US); David Puig-Oses, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/121,648

(22) Filed: Apr. 11, 2002

(65) Prior Publication Data

US 2002/0163907 A1 Nov. 7, 2002

Related U.S. Application Data (60) Provisional application No. 60/289,450, filed on May 7, 2001, and provisional application No. 60/294,674, filed on May 30, 2001.

(51) Int. Cl.[7] ................................................ H04J 3/00
(52) U.S. Cl. ........................................ 370/337; 370/347
(58) Field of Search ................................ 370/321, 328, 370/350, 353, 355, 436, 441, 442, 476, 478, 493, 494, 495, 503, 507, 509, 510, 512, 349, 347, 458, 337, 522, 529; 714/758, 775, 798, 807

(56) References Cited

U.S. PATENT DOCUMENTS

| 5,065,398 | A | * | 11/1991 | Takashima | .................. | 370/230 |
|---|---|---|---|---|---|---|
| 5,251,215 | A | * | 10/1993 | Dravida et al. | ............. | 370/471 |
| 5,432,787 | A | | 7/1995 | Chethik | ....................... | 370/79 |
| 5,453,989 | A | * | 9/1995 | Kitayama et al. | ........... | 370/241 |
| 5,473,612 | A | | 12/1995 | Dehner, Jr. et al. | ...... | 370/105.4 |
| 5,640,395 | A | * | 6/1997 | Hamalainen et al. | ....... | 370/322 |
| 5,671,237 | A | * | 9/1997 | Zook | .......................... | 714/755 |
| 5,778,013 | A | * | 7/1998 | Jedwab | ...................... | 714/807 |
| 5,787,094 | A | * | 7/1998 | Cecchi et al. | ............... | 714/807 |
| 6,148,422 | A | * | 11/2000 | Strawczynski et al. | ..... | 714/704 |
| 6,195,780 | B1 | * | 2/2001 | Dravida et al. | ............ | 714/758 |
| 6,393,013 | B1 | * | 5/2002 | Masui et al. | ................ | 370/346 |
| 6,574,211 | B2 | * | 6/2003 | Padovani et al. | ........... | 370/347 |

FOREIGN PATENT DOCUMENTS

GB 2069799 8/1981

OTHER PUBLICATIONS

CRC–based techniques for combined burst synchronization and error detection in TDMA PCS systems Hammons, A.R., Jr.; Vehicular Technology Conference, 1996. 'Mobile Technology for the Human Race'., IEEE 46th , Vol: 1 , Apr. 28–May 1, 1996 pp. 472–476.*

Detection of variable message lengths for NILE using CRC codes; Sharp, D.W.; El–Arini, M.B.; Military Communications Conference, 1991. MILCOM '91, Conference Record, 'Military Communications in a Changing World'., IEEE , Nov. 4–7, 1991 pp. 910–914 vol. 3.*

* cited by examiner

*Primary Examiner*—Chi Pham
*Assistant Examiner*—Keith M. George
(74) *Attorney, Agent, or Firm*—Philip Wadsworth; Thien T. Nguyen; Kent D. Baker (57) ABSTRACT

Systems and techniques for communications wherein a data packet is transmitted over at least one time slot from a transmission site, a value is computed from an initial value and information, the initial value being a function of the number of time slots of the data packet transmission, the value and the information is transmitted from the transmission site, the transmitted value and the information is received at a receiving site, the value from the received information is recalculated, and the number of time slots of the data packet transmission is determined from the calculated and recalculated values.

31 Claims, 5 Drawing Sheets

METHOD AND APPARATUS FOR GENERATING CONTROL INFORMATION FOR PACKET DATA

CROSS-REFERENCE TO RELATED APPLICATIONS

The present application claims priority under 35 U.S.C. §119(e) to provisional Application Serial No. 60/289,450, filed May 7, 2001 and provisional Application Serial No. 60/294,674, filed May 30, 2001, the contents of which are incorporated herein by reference.

BACKGROUND

1. Field

The present invention relates generally to communications systems, and more specifically, to systems and techniques to generate control information for packet data transport.

2. Background

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications medium. The channel allocations can take on various forms depending on the specific multi-access technique. By way of example, in FDMA systems, the total frequency spectrum is divided into a number of smaller sub-bands and each user is given its own sub-band to access the communications medium. Alternatively, in TDMA systems, each user is given the entire frequency spectrum during periodically recurring time slots. In CDMA systems, each user is given the entire frequency spectrum for all of the time but distinguishes its transmission through the use of a unique code.

CDMA is a modulation and multiple access technique based on spread-spectrum communications. In a CDMA communications system, a large number of signals share the same frequency spectrum. This is achieved by transmitting each signal with a different code that modulates a carrier, and thereby, spreads the spectrum of the signal waveform. The transmitted signals are separated in the receiver by a demodulator that uses a corresponding code to despread the desired signal's spectrum. The undesired signals, whose codes do not match, are not despread in bandwidth and contribute only to noise.

The use of CDMA techniques for multiple access communications generally provides increased user capacity over traditional TDMA and FDMA techniques. As a result, more users can access a network, or communicate with one another, through one or more base stations. In CDMA systems, the channel allocations are based on orthogonal sequences known as Walsh codes. Depending on the particular communications application, any number of Walsh code channels may be needed to support various control channels such as the pilot channel and other commonly used control channels. These control channels tend to consume system resources, and thereby, decrease user capacity by reducing the resources available to process traffic. With the tremendous increase in wireless applications over the past years, there is a need for a more efficient and robust control channel methodology which reduces computational complexity to maximize user capacity by allocating more system resources to traffic.

SUMMARY

In one aspect of the present invention, method of communications includes transmitting a data packet over at least one time slot from a transmission site, computing a value from an initial value and information, the initial value being a function of the number of time slots of the data packet transmission, transmitting the value and the information from the transmission site, receiving the transmitted value and the information at a receiving site, recalculating the value from the received information, and determining the number of time slots of the data packet transmission from the calculated and recalculated values.

In another aspect of the present invention, a communications system includes a base station having a channel element configured to generate a data packet extending over at least one time slot and compute a value from an initial value and information, the initial value being a function of the number of time slots of the data packet, and a transmitter configured to transmit the data packet, the value and the information, and a subscriber station having a receiver configured to receive the value and the information from the base station, and a processor configured to recalculate the value from the received information and determine the number of time slots of the data packet from the calculated and recalculated values.

In yet another aspect of the present invention, a transmitting device includes a channel element configured to generate a data packet extending over at least one time slot and compute a value from an initial value and information, the initial value being a function of the number of time slots of the data packet, and a transmitter configured to transmit the data packet, the value and the information.

In a further aspect of the present invention, a receiving device includes a receiver configured to receive a data packet transmitted over at least one time slot, and a value and information, the value being computed from an initial value and the information, the initial value being a function of the number of time slots of the data packet transmission, and a processor configured to recalculate the value from the received information, and determine the number of time slots of the data packet transmission from the calculated and recalculated values.

In yet a further aspect of the present invention, a computer-readable media embodying a program of instructions executable by a computer program performs a method of communications, the method including generating a data packet extending over at least one time slot, computing a value from an initial value and information, the initial value being a function of the number of time slots of the data packet, and formatting the data packet, the value, and the information for transmission over a communications medium.

In another aspect of the present invention, a communications system includes a base station having means for generating a data packet extending over at least one time slot and means for compute a value from an initial value and information, the initial value being a function of the number of time slots of the data packet, and means for transmitting the data packet, the value and the information, and a subscriber station having means for receiving the value and the information from the base station, means for recalculating the value from the received information, and determination means for determining the number of time slots of the data packet from the calculated and recalculated values.

In yet another aspect of the present invention, a transmitting device includes means for generating a data packet extending over at least one time slot, means for computing a value from an initial value and information, the initial value being a function of the number of time slots of the data packet, and means for formatting the data packet, the value and the information for transmission over a communications medium.

In a further aspect of the present invention, a receiving device includes means for receiving a data packet transmitted over at least one time slot, and a value and information, the value being computed from an initial value and the information, the initial value being a function of the number of time slots of the data packet transmission, means for recalculating the value from the received information, and determination means for determining the number of time slots of the data packet transmission from the calculated and recalculated values.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary embodiment of a communications system, data packets can be transmitted over one or more time slots. Accompanying each data packet is an information subpacket. The information subpacket includes information for decoding the corresponding data packet and a value calculated from an initial value using the information. The value embedded in the transmission can be used to determine the number of time slots used to transmit the corresponding data packet.

Various aspects of these control channel techniques will be described in the context of a CDMA communications system supporting circuit-switch voice and high-speed packet data applications. However, those skilled in the art will appreciate that these control channel techniques are likewise suitable for use in various other communications environments. Accordingly, any reference to a CDMA communications system is intended only to illustrate the inventive aspects of the present invention, with the understanding that such inventive aspects have a wide range of applications.

Figure 1:
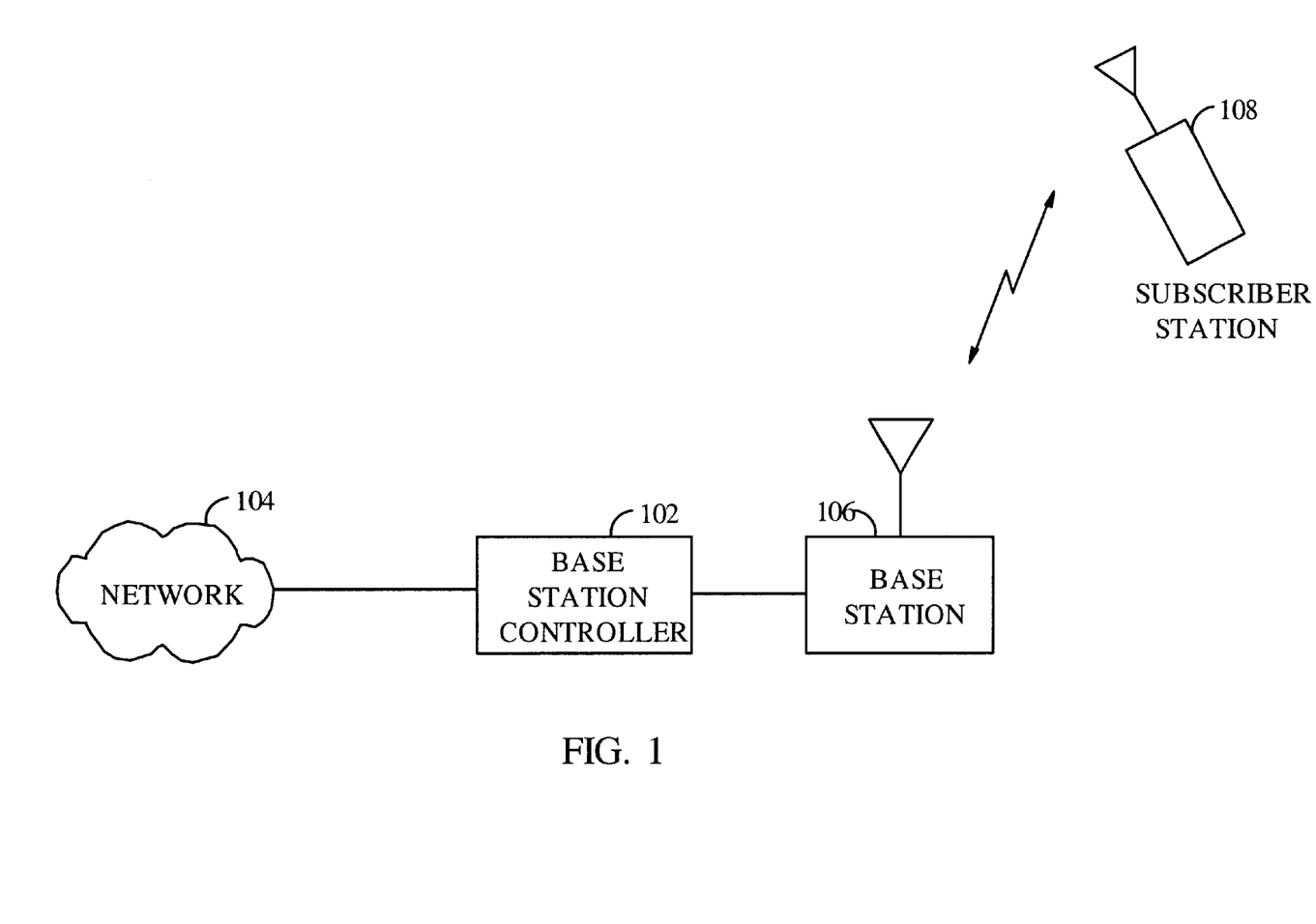
FIG. 1 is a functional block diagram of an exemplary CDMA communications system.

FIG. 1 is a simplified functional block diagram of an exemplary CDMA communications system supporting circuit-switched voice and high-speed packet data applications. A base station controller 102 can be used to provide an interface between a network 104 and all base stations dispersed throughout a geographic region. The geographic region is divided into subregions known as cells or sectors. A base station is generally assigned to serve all subscriber stations in a subregion. For ease of explanation, only one base station 106 is shown. A subscriber station 108 may access the network 104, or communicate with other subscriber stations (not shown), through one or base stations under control of the base station controller 102.

Figure 2:
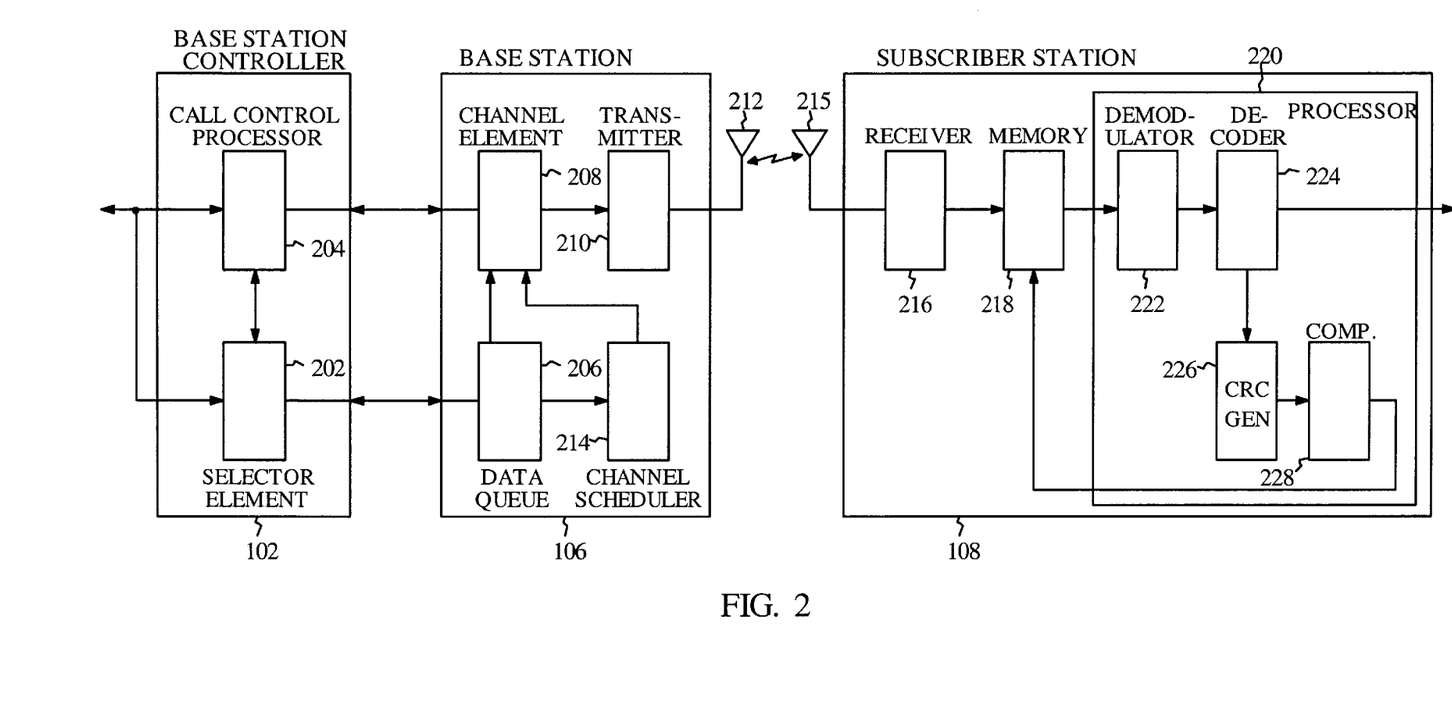
FIG. 2 is a functional block diagram illustrating the basic subsystems of the exemplary CDMA communications system of FIG. 1.

FIG. 2 is an exemplary functional block diagram illustrating the basic subsystems of the exemplary CDMA communications system of FIG. 1. The base station controller 102 contains many selector elements, although only one selector element 204 is shown for simplicity. One selector element is used to control the transmissions between one or more base stations in communication with a single subscriber station 108. When a call is initiated, a call control processor 202 can be used to establish the connection between the selector element 204 and the base station 106. The base station 106 can then assign a MAC (Media Access Controller) ID to identify communications intended for the subscriber station 108 over that connection. The assigned MAC ID can be transmitted from the base station 106 to the subscriber station 108 with the exchange of signaling messages during the set up of the call.

The selector element 204 can be configured to receive circuit-switched voice and data from the network 104. The selector element 204 sends the circuit-switched voice and data to each base station in communication with the intended subscriber station 108. The base station 106 generates a forward link transmission that includes a forward packet data channel for high speed delivery of the data from the base station 106 to one or more subscriber stations. The forward link refers to the transmission from the base station 106 to the subscriber station 108. The forward packet data channel can be composed of any number of Walsh code subchannels depending on the demands of the circuit-switched voice and data users. The forward packet data channel generally serves one subscriber station at a time in a time-division multiplexed fashion.

The base station 106 may include a data queue 206 which buffers the data from the selector element 204 before transmission to the subscriber station 108. The data from the data queue 206 can be provided to a channel element 208. The channel element 208 partitions the data into multiple data packets. Depending on the number of data packets needed to efficiently transport the data from the selector element 204, any number of Walsh code subchannels may be used. The channel element 208 then encodes the data packets using an iterative coding process such as Turbo coding, scrambles the encoded symbols using a long pseudo-random noise (PN) sequence, and interleaves the scrambled symbols. Some or all of the interleaved symbols can then be selected to form data subpackets for the initial forward link transmission or retransmission. The data subpacket symbols can then be modulated by the channel element 208 using QPSK (Quadrature Phase Shift Keying), 8-PSK, 16-QAM (Quadrature Amplitude Modulation), or any other modulation scheme known in the art, demultiplexed into in-phase (I) and quadrature (Q) components and covered with a distinct Walsh code. The data subpackets for each Walsh code subchannel can then be combined by the channel element 208 and quadrature spread using short PN codes. The short PN codes are a second layer of coding that is used to isolate one subregion from another. This approach allows the re-use of Walsh codes in every subregion. The spread Walsh subchannels can then be provided to a transmitter 210 for filtering, upconvertion, and amplification before transmission over the forward link from the base station 106 to the subscriber station 108 via an antenna 212.

The control and scheduling functions can be provided by a channel scheduler 214. The channel scheduler 214 receives the queue size from the data queue 206, which is indicative of the amount of data to transmit to the subscriber station 108, and schedules the data subpacket size and the data rate for the forward link transmission to maximize throughput and minimize transmission delay based on the quality of the communications channel between the base station 106 and the subscriber station 108. The data packet or subpacket size is defined by the number of bits contained therein. Depending on the scheduled data packet size and data rate, the data subpackets can be transmitted over one or more time slots. In one exemplary embodiment of a CDMA communications system, the data subpackets can be transmitted over one, two, four or eight 1.25 ms time slots.

The channel scheduler 214 may also schedule the modulation format of the data subpacket based on the quality of the communications channel between the base station 106 and the subscriber station 108. By way of example, in a relatively distortion free environment with little to no interference, the channel scheduler 214 may schedule a high data rate to transmit each data subpacket over one time slot with a 16-QAM modulation format. Conversely, for subscriber stations with poor channel conditions, the channel scheduler 214 may schedule a low data rate to transmit each data subpacket over eight time slots with a QPSK modulation format. The optimal combination of data rate and modulation format to maximize the throughput of the system can readily determined by those skilled in the art.

The forward link transmission generated by the base station 106 may also include one or more forward packet data control channels associated with the forward packet data channel. Conventional high-speed packet data systems with multiple time slot arrangements sometimes utilize two forward packet data control channels: a forward primary packet data control channel and a forward secondary packet data control channel. The forward secondary packet data control channel carries information subpackets which can be used by the subscriber station to receive or decode the corresponding data subpackets on the forward packet data channel. In a manner similar to the forward packet data channel, the information subpackets carried by the forward secondary packet data control channel can be transmitted over one or more time slots to optimize communications with various subscriber stations having different channel conditions. In one exemplary embodiment of a CDMA communications system, the information subpackets can be transmitted over the forward secondary packet data control channel in one, two or four 1.25 ms time slots depending on the number of time slots occupied by the corresponding data subpackets. By way of example, the information subpacket can be transmitted over one slot for a one-slot data subpacket, two slots for a two-slot data subpacket, or four slots for a four-slot or eight-slot data subpacket. To distinguish between the four-slot and eight-slot data subpacket format, various methods can be used. One approach is to use different interleavers to re-order the symbol sequence at the base station depending on whether the data subpacket is transmitted over four or eight time slots. The number of time slots occupied by the information subpacket on the forward secondary packet data control channel can be determined from information carried on the forward primary packet data control channel.

In at least one embodiment of a CDMA communications system employing multiple slot transmissions, the primary and secondary packet data control channels can be consolidated into one forward packet data control channel. In this embodiment, the number of time slots occupied by the information subpacket carried on the forward packet data control channel can be determined from the information in the subpacket itself in a variety of ways. By way of example, a cyclic redundancy check (CRC) value can be included in the information subpacket carried on the forward packet data control channel. The CRC is calculated by performing a known algorithm on the bit sequence forming the information subpacket. The algorithm is essentially a division process wherein the entire string of bits in the information subpacket is considered to be one binary number which is divided by some preselected constant. The quotient resulting from the division is discarded and any remainder is retained as the CRC value. The algorithm can be programmed in software, or alternatively, computed by hardware. The hardware can be implemented with a shift register in combination with one or more gating functions. The shift register is configured to receive the information subpacket a bit at a time. The contents of the shift register at completion of this process is the remainder of the division function, or the CRC value. This technique is well known in the art.

At the subscriber station, a CRC check function can be performed on information subpackets addressed to the subscriber station via the MAC ID. Specifically, the CRC can be recalculated over one or more time slots, and the recalculated CRC values can be compared to the transmitted CRC value embedded in the forward link transmission. The length of the information subpacket, i.e., the number of time slots occupied by the information subpacket, can then be determined from the recalculated CRC value that matches the CRC value embedded in the forward link transmission. By way of example, if the CRC value computed by the subscriber station over two time slots matches the CRC value embedded in the forward link transmission, then the length of the information subpacket is two time slots. If none of the CRC values calculated by the subscriber station match the CRC value embedded in the forward link transmission, then the subscriber station assumes that the corresponding data subpacket was intended for another subscriber station.

Once the number of times slots occupied by the information subpacket is determined, it can be used to decode the corresponding data subpacket. If the subscriber station can successfully decode the data packet, which includes the current data subpacket and any previously received data subpackets for the data packet, then the subscriber station sends an acknowledgement (ACK) response to the base station. If the data packet cannot be successfully decoded, the subscriber station then sends a negative acknowledgement (NACK) response requesting additional data subpackets. The data packet may be deemed successfully decoded if the data packet CRC checks.

The CRC protected subpacket may also provide increased system throughput by decreasing the false-alarm probability of the forward packet data control channel. The false-alarm probability is the probability that a subscriber station will attempt to erroneously decode a subpacket intended for another subscriber station.

The CRC value can also be used to distinguish between the four-slot and eight-slot data subpacket format. This can be accomplished by setting the initial CRC to one of two different values depending on the format of the data subpacket. The initial CRC value refers to the contents of the shift register before the information subpacket is shifted therethrough. In conventional CDMA communications systems employing CRC error detection, the CRC value is computed with a procedure that sets the initial CRC value to all "ones." This procedure is a convenient way to identify a data subpacket having a one, two or four-slot format, although any initial CRC value can be used. In the case where the data subpacket has an eight slot format, the CRC value can be calculated with a procedure sets the initial CRC value to all "zeros," or some other value that distinguishes the eight slot transmission from the four slot transmission. This approach may be more attractive than using two different block interleavers to distinguish between the four slot and eight slot data subpacket format because of reduced computational complexity both at the base station and subscriber station.

The channel element 208 can be used to generate the information for the forward packet data control channel. Specifically, the channel element generates a payload by packaging a 6-bit MAC JD identifying the intended subscriber station, a 2-bit subpacket ID which identifies the data subpacket, a 2-bit ARQ (Automatic Retransmission Request) channel ID which identifies the data packet from which the data subpacket was derived, and a 3-bit length field which indicates the size of the data subpacket.

The channel element 208 can be implemented in electronic hardware, in computer software, or in a combination of the two. The channel element 208 may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more of the functions described herein. In one exemplary embodiment of the channel element 208, the channel element functions can be performed with a general purpose processor such as a microprocessor, or a special purpose processor such as a programmable DSP having an embedded communications software layer to implement the channel element functions. In this embodiment, the communications software layer can be used to invoke various encoders, modulators and supporting functions to accommodate various multiple slot transmissions.

Figure 3:
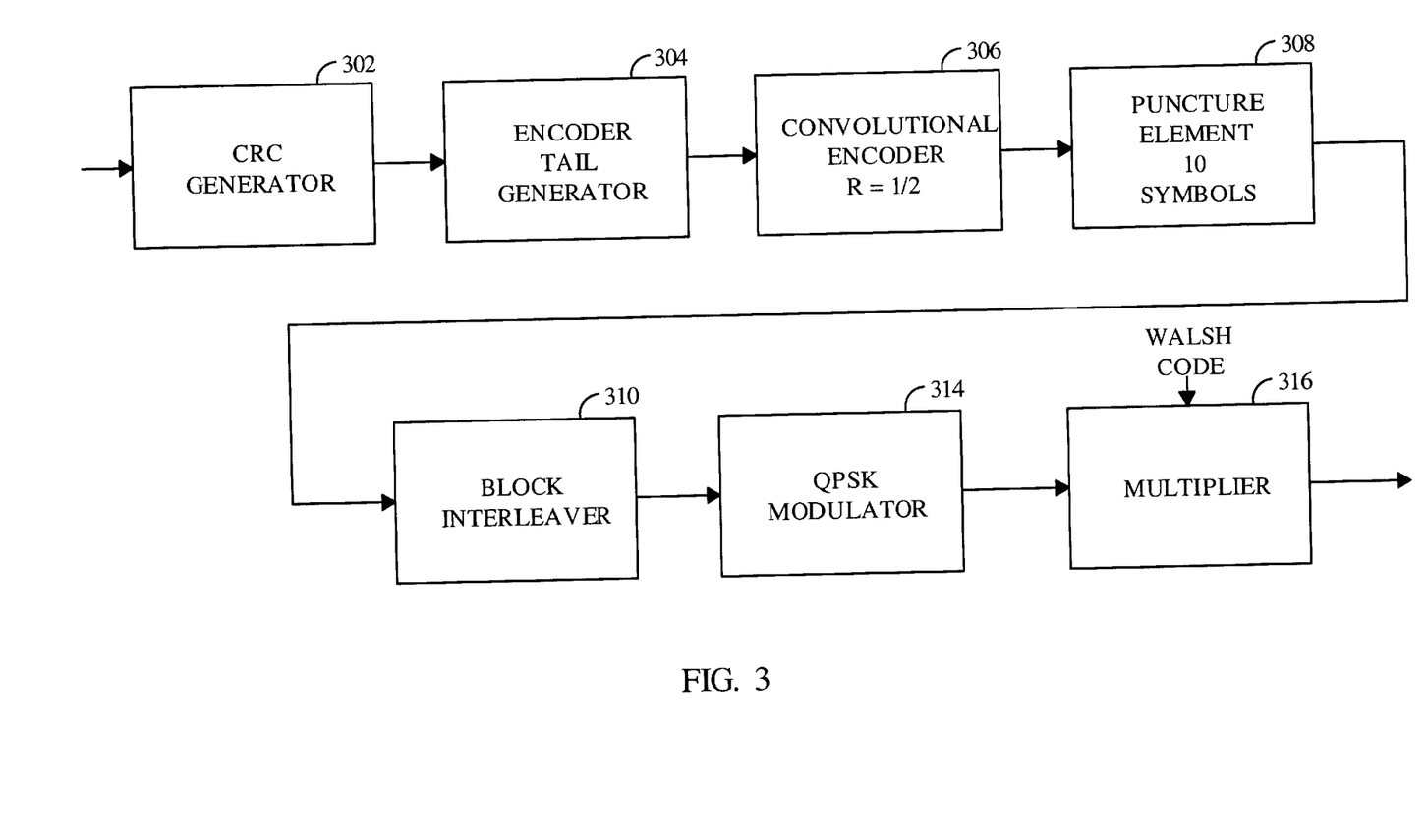
FIG. 3 is a functional block diagram illustrating an exemplary channel element configured to generate information subpackets having a one time slot format.

FIG. 3 is a functional block diagram of a channel element configuration for generating an exemplary forward packet data control channel for a one-slot transmission. In this configuration, the 13-bit payload is provided to a CRC generator 302. The CRC generator 302 can be used to calculate the CRC value over the entire payload or any portion thereof. By calculating the CRC value over only a portion of the payload, a reduction in computation complexity may be achieved. The CRC value can be any number of bits depending on the design parameters. In the described exemplary embodiment, the CRC generator 302 appends 8-bits to the payload.

The 21-bit CRC protected payload can be provided to an encoder tail generator 304. The encoder tail generator 304 generates a sequence of bits that is appended to the end of the payload. The bit sequence that makes up the tail is used to ensure that the decoder at the subscriber station is provided with a sequence that ends at a known state, thus facilitating accurate decoding. An 8-bit tail can be generated by the tail generator, however, as those skilled in the art will readily recognize, the tail can be any length.

The 29-bit CRC protected payload with the encoder tail can be provided to a convolutional encoder 306. The convolutional encoder 306 provides forward error correction capability at the subscriber station and can be implemented with any code rate and constraint length depending on the particular design parameters and the overall system constraints. In the exemplary embodiment shown in FIG. 3, the convolutional coding is performed at a ½ rate with a constraint length of 9. As a result, the 29-bit sequence input to the convolutional encoder 306 is encoded into a 58-symbol sequence. Convolutional encoding is well known, and those skilled in the art will readily be able to ascertain performance tradeoffs to determine the appropriate rate and constraint length to optimize performance.

A puncture element 308 can be used to puncture 10 symbols from the 58-symbol sequence from the convolutional encoder 306. The remaining 48-symbol sequence results in a 38.4 ksps (kilo-symbols per second) rate for a one slot transmission having a duration of 1.25 ms. As those skilled in the art will readily appreciate, the number of symbols punctured from symbol sequence output from the convolutional encoder can be varied in accordance with different system parameters to achieve an optimal symbol rate based on the coding rate of the convolutional encoder and the time slot duration of the communications system.

Various processing techniques can be applied to the 48-symbol sequences to minimize the affect of burst errors on the ability of the decoder at the subscriber station to decode the symbol sequence. By way of example, the 48-symbol sequence from the puncture element 308 can be provided to a block interleaver 310 which re-orders the sequence of the symbols.

The symbol sequence from the block interleaver 310 can be provided to a modulator 314 which may support various modulation schemes such as QPSK, 8-PSK, 16-QAM, or any other modulation scheme known in the art. In the described exemplary embodiment, a QPSK modulator 314 is used. The modulated symbols from the modulator 314 can then be separated into their respective I and Q components and covered with a distinct Walsh code with a multiplier 316 before being combined with the forward packet data channel and other Walsh subchannels. The multiple Walsh subchannels can then be quadrature spread using the short PN codes and coupled to the transmitter 210 for filtering, upconversion, and amplification before transmission over the forward link from the base station 106 to the subscriber station 108 (see FIG. 2).

Figure 4:
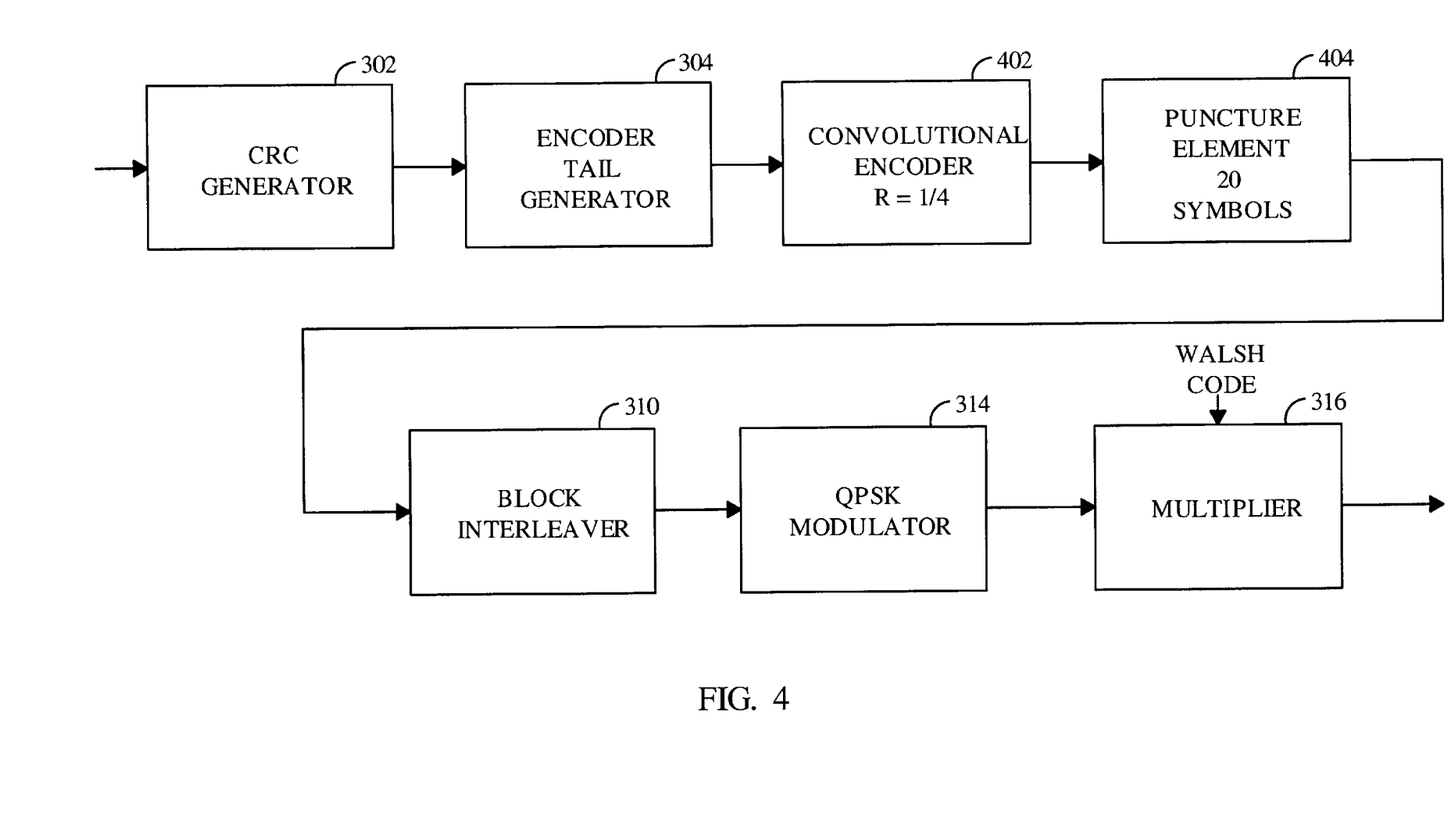
FIG. 4 is a functional block diagram illustrating an exemplary channel element configured to generate information subpackets having a two time slot format.

FIG. 4 is a functional block diagram of a channel element configuration for generating an exemplary forward packet data control channel for a two-slot transmission. In a manner similar to the one slot transmission format, a 13-bit payload can be appended with an 8-bit CRC value produced by the CRC generator 302 and an 8-bit encoder tail produced by the encoder tail generator 304. The resultant 21-bit sequence can be provided to a convolutional encoder 402. Because of the two-slot format, the convolutional encoder 402 is set to a ¼ rate with a constraint length of 9 to produce a 116-symbol sequence. A puncture element 404 can be used to puncture 20 symbols from the 116-symbol sequence produced by the convolutional encoder 402. The resulting 96-symbol sequence supports a 38.4 ksps symbol rate for a two-slot transmission having a 1.25 ms duration.

The remaining functions of the channel element are the same as described in connection with FIG. 3. The 96-symbol sequence is interleaved, separated into I and Q components, and covered with a distinct Walsh code before being combined with the forward packet data channel and other Walsh subchannels. The multiple Walsh subchannels can then be quadrature spread using the short PN codes, and provided to the transmitter for filtering, upconversion, and amplification before transmission over the forward link from the base station 106 to the subscriber station 108 (see FIG. 2).

Figure 5:
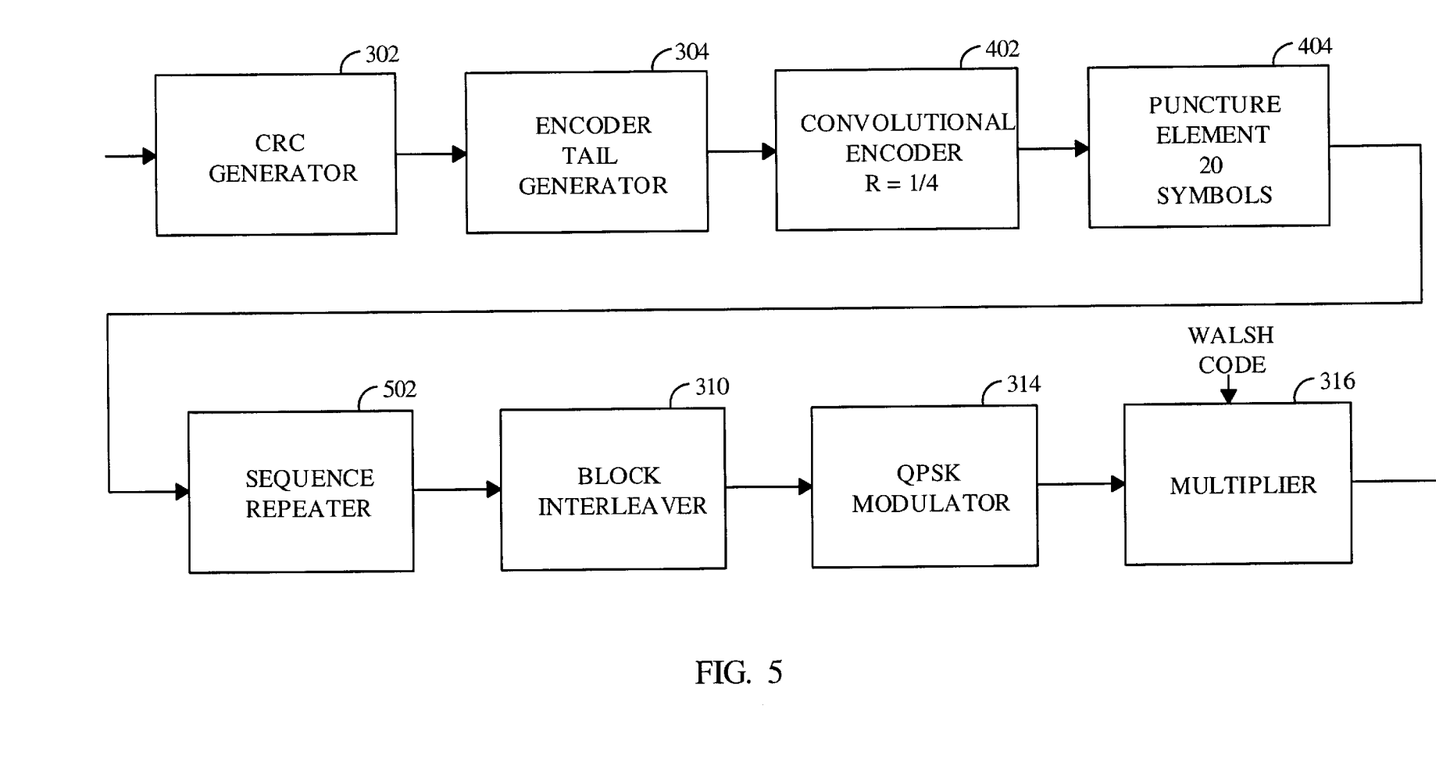
FIG. 5 is a functional block diagram illustrating an exemplary channel element configured to generate information subpackets having a four-time slot format.

FIG. 5 is a functional block diagram of a channel element configuration to generate an exemplary forward packet data control channel for a four-slot transmission. In a manner similar to the one and two slot transmission formats, the 13-bit payload can be appended with an 8-bit CRC value produced by the CRC generator 302 and an 8-bit tail produced by the encoder tail generator 304. The resultant 21-bit sequence can be encoded with the convolutional encoder 402 at a ¼ rate with a constraint length of 9 to produce a 116-symbol sequence in which 20 symbols are punctured by the puncture element 404 resulting in a 96-symbol sequence.

The main difference between the two and four slot transmission formats is the addition of a sequence repeater 502 following the puncture element 404 to produce the four-slot transmission format. The sequence repeater 502 can be used to repeat the 96-symbol sequence twice to produce a 192-symbol sequence to accommodate a four-slot transmission. In the described exemplary embodiment, the sequence repeater 502 is positioned at the output of the puncture element 404; however, the sequence repeater 502 could alternatively be positioned upstream or downstream from the puncture element 404. The sequence repeater 502 can be configured to repeat the symbol sequence as many times as desired depending on the system requirements. By way of example, the convolutional encoder 402 could be set at a 1/2 rate to produce a 58-symbol sequence. The 58-symbol sequence could have 10 symbols punctured by the puncture element 404, and the resulting 48-symbol sequence repeated four times by the sequence repeater 502 to accommodate a four slot transmission. Those skilled in the art will readily be able to adjust the repetition number of the sequence repeater and the rate of the convolutional encoder to optimize system performance for one, two, four, or other multiple time slot formats.

The remaining functions of the channel element are the same as described in connection with FIG. 4. The 192-symbol sequence is interleaved, separated into 1 and 0 components, and covered with a distinct Walsh code before being combined with the forward packet data channel and other Walsh subchannels. The multiple Walsh subchannels can then be quadrature spread using the short PN codes, and provided to the transmitter for filtering, upconversion, and amplification before transmission over the forward link from the base station 106 to the subscriber station 108 (see FIG. 2).

Returning to FIG. 2, the forward link transmission from the base station 106 is received by an antenna 215 at the subscriber station 108. The received signal is routed from the antenna 215 to a receiver 216. The receiver 216 filters and amplifies the signal, downconverts the signal to baseband, and quadrature demodulates the baseband signal. The baseband signal is then sampled and stored in memory 218. The memory 218 should be sufficiently sized to store enough samples to cover the maximum allowable number of time slots for a forward link subpacket transmission.

In an exemplary CDMA communications system, the samples are released from the memory 218 to a processor 220 in a one, two, four or eight slot format. The processor 220 performs several functions which are illustrated in FIG. 2 by a demodulator 222, a decoder 224, a CRC generator 226 and a comparator 228. These functions may be implemented directly in hardware, in software executed by the processor, or in a combination of the two. The processor may be implemented with a general or special purpose processor, a DSP, an ASIC, a FPGA or other programmable logic device, discrete gate or transistor logic, discrete hardware components, or any combination thereof designed to perform one or more of the aforesaid functions. As those skilled in the art will appreciate, a separate processor can be used to perform each function, or alternatively, multiple functions can be partitioned among any number of processors.

In one exemplary embodiment of a CDMA communications system, the memory 218 initially releases one time slot worth of samples to the demodulator 222 where they are quadrature demodulated with the short PN codes and despread into symbols using Walsh codes. The symbol sequence for the forward packet data control channel can then be demodulated using QPSK, 8-PSK, 16-QAM, or any other modulation scheme employed by the base station 106. The demodulated symbol sequence can then be provided to the decoder 224 which performs the inverse of the signal processing functions done at the base station, specifically the de-interleaving and decoding.

Assuming the decoded bit sequence includes the MAC ID for the subscriber station, the decoded bit sequence can be provided to a CRC generator 226. The CRC generator 226 computes a CRC value with a procedure that sets the initial CRC value to all "ones." The locally generated CRC value is then compared to the decoded CRC value embedded in the forward link transmission with the comparator 228. The results of the comparison are used to determine whether the information subpacket carried on the forward packet data control channel is one time slot. If the locally generated CRC value matches the decoded CRC value embedded in the forward link transmission, the information subpacket is determined to be one time slot in length and the payload can be used by the processor 220 to decode the corresponding data subpacket.

Conversely, if the locally generated CRC value does not match the decoded CRC value embedded in the forward link transmission, then the information subpacket is either corrupted, or it is more than one time slot in length. In that event, the processor 220 releases two time slots worth of samples from the memory 218 for demodulation, decoding and CRC check functions. The processor 220 then computes a new CRC value with the initial CRC value set to all "ones" and compares the locally generated CRC value to the decoded CRC value embedded in the forward link transmission. If the comparison is successful, the data subpacket is determined to be two time slots in length. In that case, the payload of the information subpacket can be used to decode the corresponding data subpacket.

In the event that the locally generated CRC value does not match the decoded CRC value embedded in the forward link transmission, then the processor 220 releases four time slots worth of samples from the memory 218 for demodulation, decoding and CRC check functions. The processor 220 then computes a new CRC value with the initial CRC value set to all "ones" and compares the locally generated CRC value to the decoded CRC value embedded in the forward link transmission. If the comparison is successful, the data subpacket is determined to be four time slots in length. In that case, the payload of the information subpacket can be used to decode the corresponding data subpacket.

Conversely, if the locally generated value does not match the decoded CRC value embedded in the forward link transmission, then the processor 220 determines whether the decoded CRC value is valid for a CRC value computed at the base station with the initial CRC value set to all "zeros." One way to do that is to recompute the locally generated CRC value with the initial CRC value set to all "zeros." Another approach is to perform a bit-by-bit modulo-2 addition between the locally generated CRC value (with the initial CRC value set to all "ones") and a predetermined bit sequence. The predetermined bit sequence can be computed by performing a bit-by-bit modulo-2 addition between the two possible initial CRC values, in this case all "ones" and all "zeros," and computing the CRC value that would result from feeding a string "zero" bits, equal to the number of payload bits, into a similar CRC generator with the initial CRC value set to the resultant sum of the bit-by-bit modulo-2 addition. The resultant CRC value is the same as if the CRC value was computed with an initial CRC value set to all "zeros."

Regardless of the approach, the recomputed CRC value can be compared with the decoded CRC value embedded in the forward link transmission. If the two values match, the data subpacket is determined to be eight slots in length and the payload can be used to decode the corresponding data subpacket. If two values do not match, then the subscriber station assumes that the corresponding data subpacket was intended for another subscriber station.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
    obtaining information for transmission;
    determining a number of time slots for transmission of a data packet;
    calculating an error checking value from an initial value selected from a set of initial values and the information, both the initial value and the error checking value being a function of the number of time slots;
    transmitting the calculated error checking value and the information, in the data packet, over the number of time slots;
    receiving the calculated error checking value and the information;
    recalculating the error checking value from the received information and at least one initial value selected from the set of initial values;
    determining the number of time slots using the calculated error checking value and the recalculated error checking value.

2. The method of claim 1 wherein the calculated and recalculated error checking values comprise cyclic redundancy check values.

3. The method of claim 2 wherein a calculated cyclic redundancy check value comprises a first initial value if the data packet is transmitted over a first number of time slots and a second initial value if the data packet is transmitted over a second number of time slots.

4. The method of claim 3 wherein the data packet is transmitted over the first number of time slots, and the determination of the number of time slots of the data packet transmission comprises comparing the calculated and recalculated cyclic redundancy check values.

5. The method of claim 3 wherein the data packet is transmitted over the second number of time slots, and the determination of the number of time slots of the data packet transmission comprises performing a modulo-2 addition of the recalculated cyclic redundancy check value with a predetermined value and comparing the result to the calculated cyclic redundancy check value.

6. The method of claim 3 wherein the calculated cyclic redundancy check value and the information is transmitted over the first number of time slots.

7. The method of claim 6 wherein the first number of time slots comprises four time slots and the second number of time slots comprises eight time slots, the time slots each being 1.25 milliseconds.

8. A communications system, comprising:
a base station having a channel element configured to generate a data packet extending over at least one time slot and calculate an error checking value from an initial value and information, the initial value being a function of the number of time slots of the data packet, and a transmitter configured to transmit the data packet, containing the calculated error checking value and the information; and
a subscriber station having a receiver configured to receive the data packet containing the calculated error checking value and the information from the base station, and a processor configured to recalculate the error checking value and received information and determine the number of time slots of the data packet from the calculated and recalculated error checking values.

9. The communications system of claim 8 wherein the calculated error checking value and the recalculated error checking value comprise cyclic redundancy check values.

10. The communications system of claim 9 wherein the channel element is further configured to set the calculated cyclic redundancy check value to a first initial value if the data packet extends over a first number of time slots and a second initial value if the data packet extends over a second number of time slots.

11. The communications system of claim 10 wherein the data packet extends over the first number of time slots, and the processor is further configured to determine the number of time slots of the data packet by comparing the calculated and recalculated cyclic redundancy check values.

12. The communications system of claim 10 wherein the data packet extends over the second number of time slots, and the processor is further configured to determine the number of time slots of the data packet by a modulo-2 addition of the recalculated cyclic redundancy check value with a predetermined value and comparing the result to the calculated cyclic redundancy check value.

13. The communications system of claim 10 wherein the calculated cyclic redundancy check value and the information extends over the first number of time slots.

14. The communications system of claim 13 wherein the first number of time slots comprises four time slots and the second number of time slots comprises eight time slots, the time slots each being 1.25 milliseconds.

15. A transmitting device, comprising:
a channel element configured to:
generate a data packet extending over at least one time slot and calculate an error checking value from an initial value and information, the initial value being a function of the number of time slots of the data packet, and
set the initial value for the calculated cyclic redundancy check value to a first value if the data packet extends over a first number of time slots and a second value if the data packet extends over a second number of time slots; and
a transmitter configured to transmit the data packet, the calculated error checking value and the information,
wherein the calculated error checking value comprises a cyclic redundancy check value
wherein the calculated cyclic redundancy check value and the information extend over the first number of time slots, and
wherein the first number of time slots comprises four time slots and the second number of time slots comprises eight time slots, the time slots each being 1.25 milliseconds.

16. A receiving device, comprising:
a receiver configured to receive a data packet transmitted over at least one time slot, and an error checking value and information, the error checking value being calculated from an initial value and the information, the initial value being a function of the number of time slots of the data packet transmission; and
a processor configured to recalculate the error checking value from the received information, and determine the number of time slots of the data packet transmission from the calculated and recalculated error checking values.

17. The receiving device of claim 16 wherein the calculated and recalculated error checking values comprise calculated and recalculated cyclic redundancy check values.

18. The receiving device of claim 17, wherein the processor is further configured to determine the number of time slots of the data packet transmission by comparing the calculated and recalculated cyclic redundancy check values.

19. The receiving device of claim 17 wherein the processor is further configured to determine the number of time slots of the data packet transmission by a modulo-2 addition of the recalculated cyclic redundancy value with a predetermined value and comparing the result to the calculated cyclic redundancy check value.

20. A computer-readable medium embodying a program of instructions executable by a computer program to perform a method of communications, the method comprising:
generating a data packet extending over at least one time slot;
computing an error checking value from an initial value and information, the initial value being a function of the number of time slots of the data packet; and
formatting the data packet, the error checking value, and the information for transmission over a communications medium,
wherein the error checking value comprises a cyclic redundancy check value,
wherein the initial value for the calculated cyclic redundancy check value comprises a first value if the data packet extends over a first number of time slots and a second value if the data packet extends over a second number of time slots,
wherein the calculated cyclic redundancy check value and the information extends over the first number of time slots, and
wherein the first number of time slots comprises four time slots and the second number of time slots comprises eight time slots, the time slots each being 1.25 milliseconds.

21. A communications system, comprising:

a base station for generating a data packet extending over at least one time slot means for calculating an error checking value from an initial value and information, the initial value being a function of the number of time slots of the data packet, and means for transmitting the data packet, the calculated error checking value and the information;

a subscriber station for receiving the calculated error checking value and the information, means for recalculating the error checking value from the received information, and means for determining the number of time slots of the data packet from the calculated and recalculated error checking values.

22. The communications system claim 21 wherein the base station further comprises means for setting the calculated cyclic redundancy check value to a first initial value if the data packet extends over a first number of time slots and a second initial value if the data packet extends over a second number of time slots.

23. The communications system of claim 22 wherein the data packet extends over the first number of time slots, and wherein the means for determining the number of time slots, further comprises means for comparing the calculated and recalculated cyclic redundancy check values.

24. The communications system of claim 22 wherein the data packet extends over the second number of time slots, and wherein the means for determining the number of time slots, further comprises means for performing a modulo-2 addition of the recalculated cyclic redundancy check value with a predetermined value and comparing the result with the calculated cyclic redundancy check value.

25. The communications system of claim 22 wherein the calculated cyclic redundancy check value and the information extends over the first number of time slots.

26. The communications system of claim 25 wherein the first number of time slots comprises four time slots and the second number of time slots comprises eight time slots, the time slots each being 1.25 milliseconds.

27. A transmitting device, comprising:

means for generating a data packet extending over at least one time slot;

means for calculating an error checking value from an initial value and information, the initial value being a function of the number of time slots of the data packet;

means for formatting the data packet, the calculated error checking value and the information for transmission over a communications medium, wherein the calculated error checking value comprises a calculated cyclic redundancy check value, and wherein the calculated cyclic redundancy check value comprises a bit sequence; and means for setting the initial value for the calculated cyclic redundancy check value to a first value if the data packet extends over a first number of time slots and to a second value if the data packet extends over a second number of time slots, wherein the calculated cyclic redundancy check value and the information extend over the first number of time slots, and wherein the first number of time slots comprises four time slots and the second number of time slots comprises eight time slots, the time slots each being 1.25 milliseconds.

28. A receiving device, comprising:

means for receiving a data packet transmitted over at least one time slot, and an error checking value and information, the error checking value being calculated from an initial value and the information, the initial value being a function of the number of time slots of the data packet transmission;

means for recalculating the error checking value from the received information; and means for determining the number of time slots of the data packet transmission from the calculated and recalculated error checking values.

29. The receiving device of claim 28 wherein the calculated and recalculated error checking values comprise cyclic redundancy check values.

30. The receiving device of claim 29 wherein the means for determining the number of time slots further comprises means for comparing the calculated and recalculated cyclic redundancy check values.

31. The receiving device of claim 29 wherein the means for determining the number of time slots further comprises means for performing a modulo-2 addition of the recalculated cyclic redundancy check value with a predetermined value and comparing the result with the calculated cyclic redundancy check value.

* * * * *